(12) United States Patent
Chiang

(10) Patent No.: US 7,421,768 B2
(45) Date of Patent: Sep. 9, 2008

(54) FUEL HOSE LINE INSTALLATION APPARATUS

(76) Inventor: Chun-Pao Chiang, No. 7, Alley 3, Lane 58, Ya-Chou Road, Tu-Cheng, Taipei County (TW)

( * ) Notice: Subject to any disclaimer, the term of this patent is extended or adjusted under 35 U.S.C. 154(b) by 208 days.

(21) Appl. No.: 11/209,419

(22) Filed: Aug. 23, 2005

(65) Prior Publication Data
US 2007/0050961 A1 Mar. 8, 2007

(51) Int. Cl.
*B23P 19/04* (2006.01)
(52) U.S. Cl. .......................... 29/237; 29/271; 29/281.1; 29/243; 269/43
(58) Field of Classification Search .................. 29/237, 29/243.55, 276, 270, 281.1, 243, 271; 269/246, 269/43, 45
See application file for complete search history.

(56) References Cited

U.S. PATENT DOCUMENTS

| | | | | |
|---|---|---|---|---|
| 2,568,952 | A * | 9/1951 | Dailey | 269/98 |
| 6,179,279 | B1 * | 1/2001 | Asai et al. | 269/164 |
| 6,196,536 | B1 * | 3/2001 | Hintze | 269/282 |
| 7,147,614 | B2 * | 12/2006 | Fini | 604/6.15 |
| 2002/0042979 | A1 * | 4/2002 | Ishida et al. | 29/237 |
| 2007/0050961 | A1 | 3/2007 | Chiang | 29/271 |

\* cited by examiner

*Primary Examiner*—Lee D Wilson

(57) ABSTRACT

A fuel hose line assembling apparatus comprises a base, a transmission, a fixing member and a hose fixing jig. The base comprises at least two chutes. The transmission and the hose fixing jig are mounted on two sides of the base respectively. An adjusting screw is movably installed in the pedestal and the fixing member is mounted on one side of the adjusting screw. Therefore, the fixing member is moved on the base by the adjusting screw driving. Moreover, the fixing member has a fixture jig for putting a nut therein and the hose fixing jig clips a hose fixedly. When a user drives the transmission to move the fixing member, the nut is firmly scabbarded in the hose line.

1 Claim, 4 Drawing Sheets

FUEL HOSE LINE INSTALLATION APPARATUS

BACKGROUND OF THE INVENTION

1. Field of the Invention

The present invention relates to hose line assembling apparatus, and more particularly to a mechanism for assembling a nut into the hose line.

2. Description of the Prior Art

The metal fuel line used in a car or a machine is comprised of a central pipe made up of Teflon or other materials with similar effect and a metallic jacket tightly covered on the outside of the central hose. The feature is to not expand whiling being pressing for avoiding the pressure losing. However, no installation equipment for the metal fuel line is available in the market. Due to the structure of metallic jacket, the metallic jacket at the cutting plane of the metal fuel hose has an abnormal diffusion whiling performing the hose assembly.

Recently, the metal fuel hose line is assembled manually by workers, and so the abnormal diffusion of the metallic jacket is easy to hurt the workers and to affect the stability between the hose line and a joint.

SUMMARY OF THE INVENTION

In view of the problems mentioned above, a main objective of the present invention is to provide a fuel hose line installation apparatus to fast and safely assemble fuel hose line.

Hence, the present invention discloses a fuel hose line assembling apparatus comprises a base, a transmission, a fixing member and a stainless steel braided fixing jig. The transmission and the hose fixing jig are mounted on the base. The transmission has a pedestal in that an adjusting screw movably installed. A fixing member having a fixture jig therein is assembled at a side of the adjustable screw. A nut can be put into the fixture jig and the hose fixing jig can clips a hose. Therefore, the work drives the transmission to move the fixing member to firmly scabbard the nut in the hose line.

DESCRIPTION OF THE PREFERRED EMBODIMENT

Figure 1:
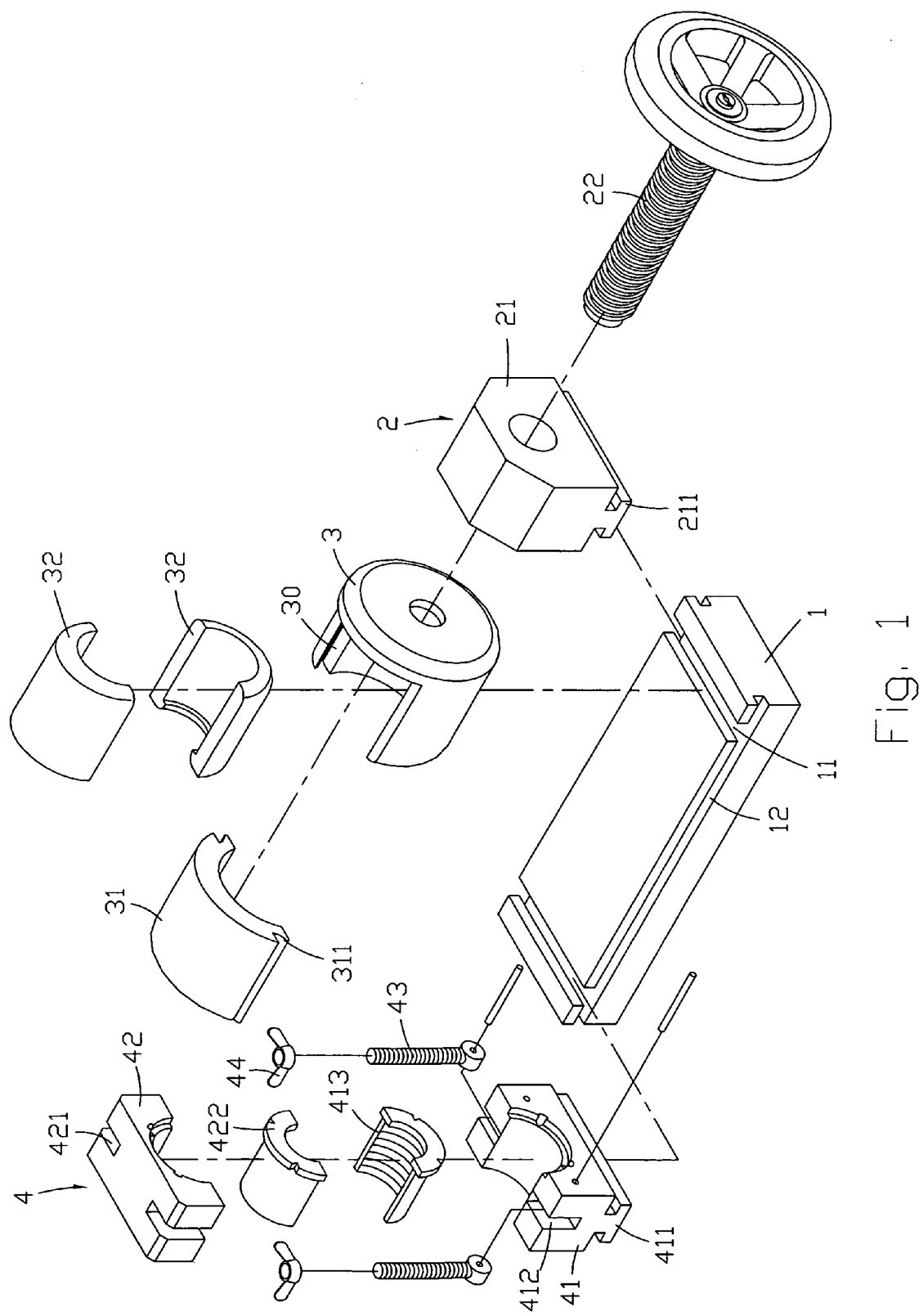
FIG. 1 is an exploded view of the present invention.
Figure 2:
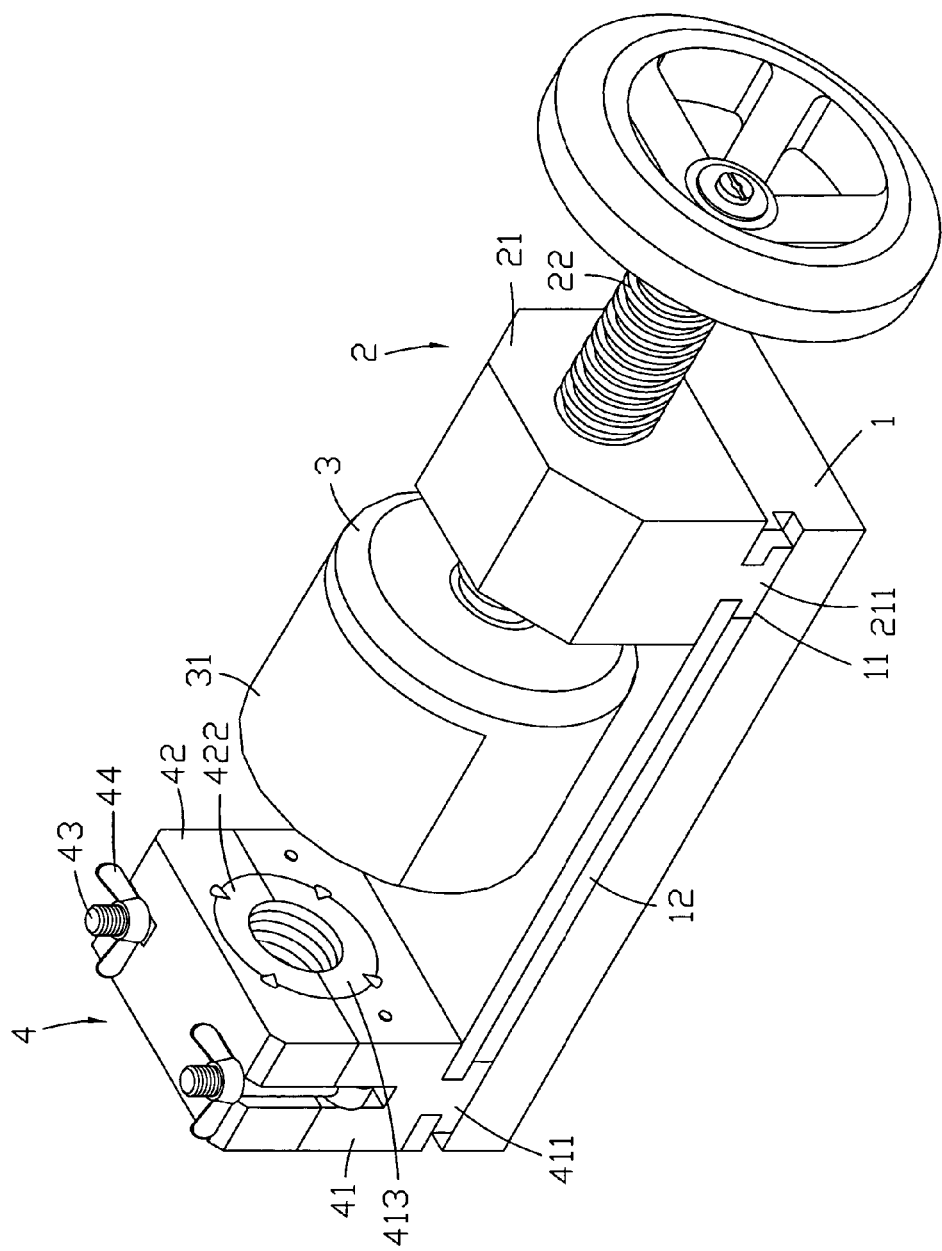
FIG. 2 is a three dimensional view of the present invention.

Referring to FIG. 1 and FIG. 2, they are respectively an exploded view and a three dimensional view of the present invention. As shows in FIG. 1 and FIG. 2, the fuel hose line assembling apparatus comprises an elongated plate shaped base 1, a black shaped transmission 2, a cylindrical shaped fixing member 3, and a hose fixing jig 4. The base 1 comprises at least two chutes 11 at two opposite longitudinal lateral sides thereof. The transmission has a pedestal 21 and an adjusting screw rod 22 is movably installed in the pedestal 21. Moreover, the pedestal 21 of the transmission 2 has a slide 211 to insert into the chute 11 via an end side of the base 1.

The fixing member 3 is mounted to an end of the adjusting screw rod 22. A fixture jig 32 composed of two separable portions is installed in the fixing member 3. In addition, the fixing member 3 includes a detachable sector shaped upper cover 31 with two opposite longitudinal sides having a slide 311 respectively. The fixing member 3 has two longitudinal sides with a chute respectively to correspond to the slide 311 the chute 30 and the slide 311 joint with each other. The hose fixing jig 4 is mounted to another end side of the base 1 to be opposite to the transmission 2 and has a fixed portion 41 and a movable portion 42. The fixed portion 41 has a slide 411 to inset into the chute 11 of the base 1. Furthermore, the fixed portion 41 and the movable portion 42 have grooves 412, 421 and grips 413, 422 respectively. A screw 43 is moveable assembled in the groove 412 of the fixed portion 41 and passes the groove 421 of the movable portion 42 to tightly fasten the fixed portion 41 and the movable portion 42 with a nut 44.

Figure 3:
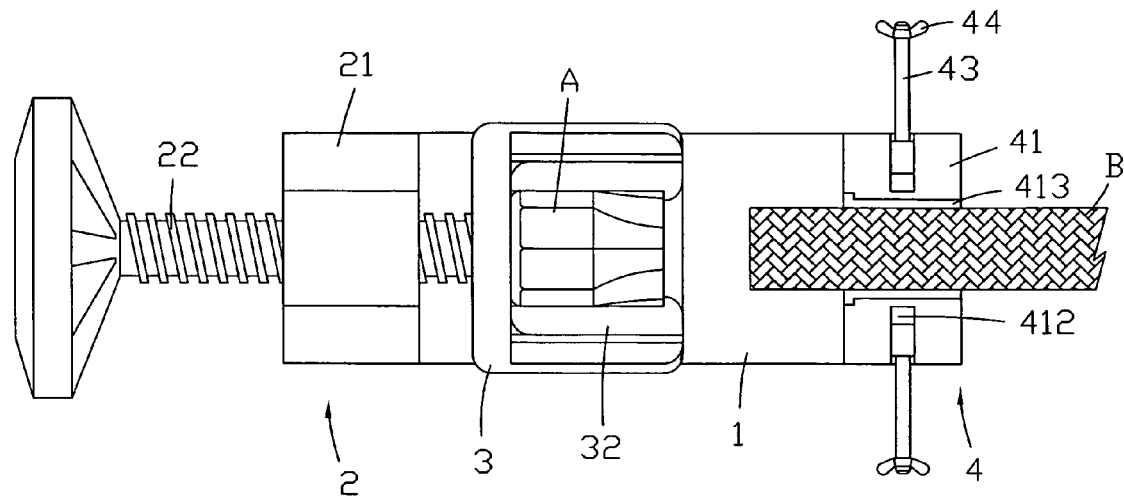
FIG. 3 is an assembly diagram of the present invention before assembling.
Figure 4:
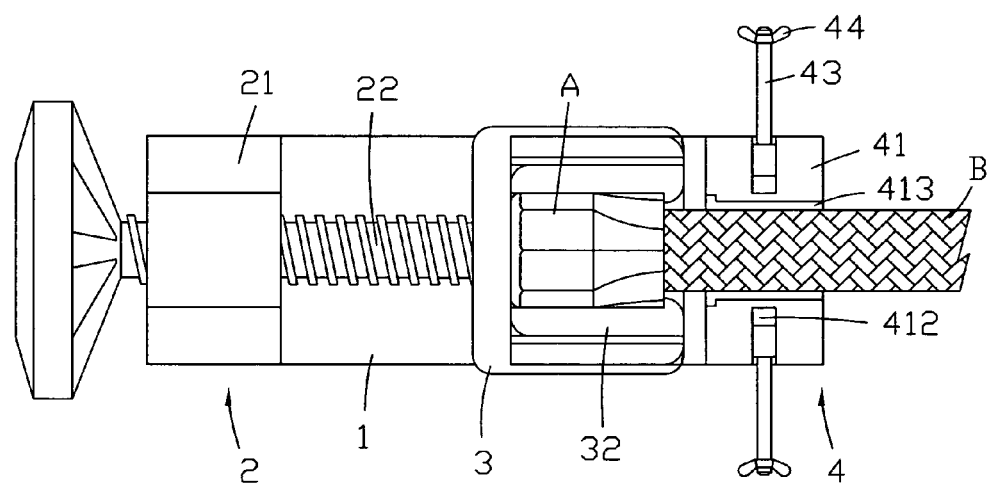
FIG. 4 is an assembly diagram of the present invention after assembled.

Referring to FIG. 3 and FIG. 4, they are respectively assembly diagrams before assembling and after assembled in the present invention. As shown in FIG. 3 and FIG. 4, first a nut A is put in the fixture jig 32 of the fixing member 3 and then the upper cover 31 is closed on the fixing member 3. Next, a hose line B is put into the grip 413 of the fixed portion 41 and the length of the hose B is adjusted to an applicable length. After that, the grip 422 and the movable 42 are covered on the fixed portion 41 respectively, and the screw 43 is screwed with the nut 44 to tightly fasten the fixed portion 41 and the movable portion 42. Namely, the hose B can be stably clasped by the grips 413, 422. When finished the steps mentioned above, the user drives the adjusting screw 22 of the transmission to move the fixing member 3 forward to scabbard the nut A into the hose B for completing the combination of the nut A and the hose B. Finally, the user opens the upper cover 31 and unscrews the screw 43 and the nut 44 to dismantle the movable portion 42, and takes the hose line B assembled with nut A out.

Figure 5:
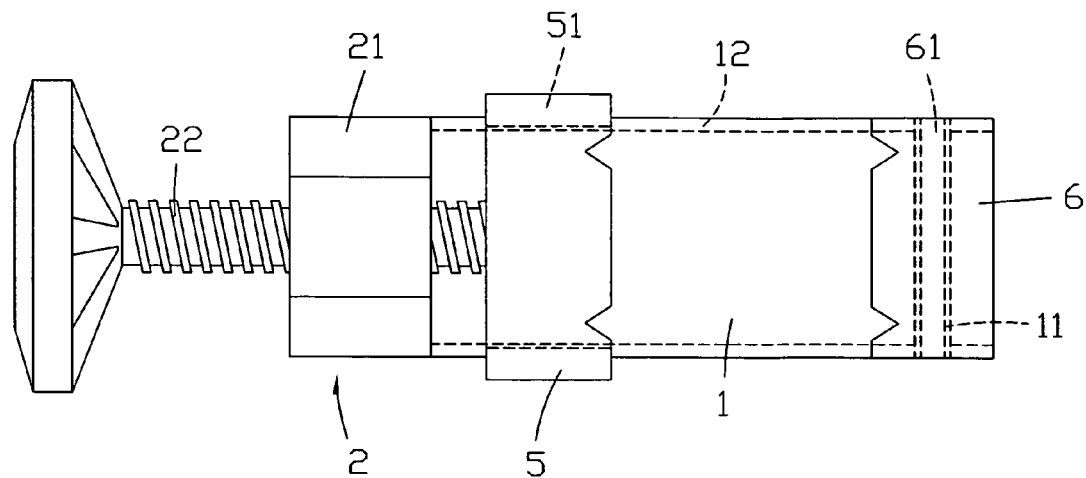
FIG. 5 is a schematic diagram of a preferred embodiment in the present invention.
Figure 6:
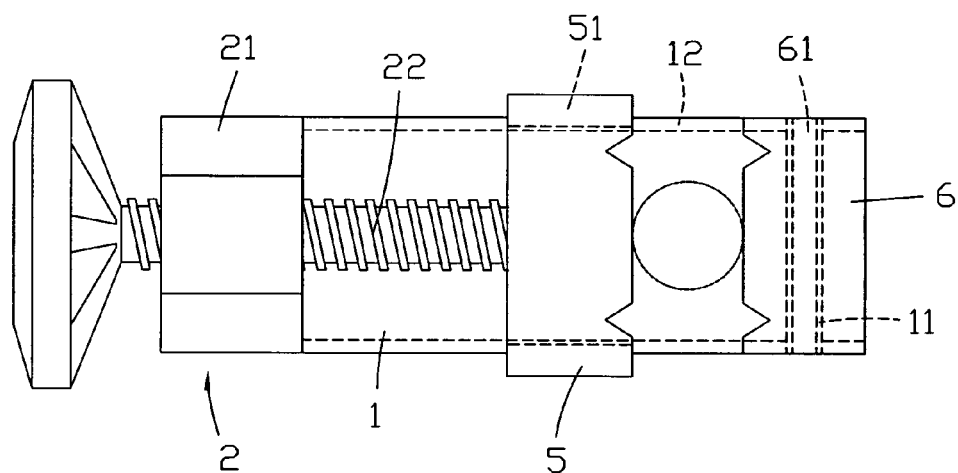
FIG. 6 is an assembly diagram of the preferred embodiment in the present invention.

Referring to FIG. 5 and FIG. 6, they are respectively a schematic diagram and an assembly diagram of a preferred embodiment in the present invention. As shown in FIGS. 5 and 6, the base 1 has a track 12 thereon and has a first fixture 5 and a second fixture 6 installed thereon. The first fixture has a lock block 51 that is adapted to insert into the track 12 of the base 1 and combined on one side of the adjusting screw 22. The second fixture 61 ha a slide 61 adapted to insert into the chute 11 of the base 1. Therefore, when the user drives the adjusting screw 22 of the transmission 22 to move the first fixture 5 forward, the first fixture 5 and the second fixture 6 are fastened tightly for achieving the clasping or pressing function.

Although specific embodiments have been illustrated and described, it will be obvious to those skilled in the art that various modifications may be made without departing from what is intended to be limited solely by the appended claims.

What is claimed is:

1. A fuel hose line assembling apparatus comprising:

an elongated plate shaped base;

a transmission having a pedestal movably mounted to an end side of said base and an adjusting screw rod movably installed in said pedestal;

a cylindrical fixing member being mounted to an end of said adjusting screw rod, moved on said base by said adjusting screw rod, and having a fixture jig therein for putting a nut; and a hose fixing jig being mounted to another end side of said base and opposite to said transmission for fixedly clipping a hose;

wherein said fixing member has a detachable upper cover and a chute extending along two opposite lateral sides thereof and said upper cover has a slide at two opposite lateral sides thereof to correspond to said chute such that said slide is capable of inserting into said chute.

* * * * *